United States Patent [19]

Takahashi et al.

[11] Patent Number: 5,120,385
[45] Date of Patent: Jun. 9, 1992

[54] FOAMABLE SILICONE COMPOSITION, SILICONE SPONGE, AND SILICONE SPONGE ROLL

[75] Inventors: Masaharu Takahashi; Jun Hatakeyama; Ken-ich Takita, all of Annaka, Japan

[73] Assignee: Shin Etsu Chemical Company, Ltd., Tokyo, Japan

[21] Appl. No.: 691,868

[22] Filed: Apr. 26, 1991

Related U.S. Application Data

[62] Division of Ser. No. 527,359, May 23, 1990.

[30] Foreign Application Priority Data

May 25, 1989 [JP] Japan ................. 1-132299

[51] Int. Cl.⁵ ............... B29C 47/00; C08J 9/10
[52] U.S. Cl. .................... 156/244.12; 156/294; 521/79; 521/91; 521/95; 521/96; 521/154
[58] Field of Search ........... 521/154, 79, 91, 95, 521/96, 154; 156/244.12, 294

[56] References Cited

U.S. PATENT DOCUMENTS

| | | | |
|---|---|---|---|
| 2,816,089 | 12/1957 | Willis | 521/154 |
| 2,875,163 | 2/1959 | Berrige | 521/154 |
| 3,565,858 | 2/1971 | Kniege et al. | 521/154 |
| 4,026,846 | 5/1977 | Kittle et al. | |
| 4,459,247 | 7/1984 | Rothemund | 521/154 |

FOREIGN PATENT DOCUMENTS

| | | |
|---|---|---|
| 2546698 | 1/1977 | Fed. Rep. of Germany . |
| 487969 | 5/1970 | Switzerland . |
| 1130674 | 10/1968 | United Kingdom . |

Primary Examiner—Morton Foelak
Attorney, Agent, or Firm—Birch, Stewart, Kolasch & Birch

[57] ABSTRACT

A process for preparing a silicone sponge roll, which comprises uniformly mixing a foamable silicone composition comprising (A) a vinyl-free organopolysiloxane $R_aSiO_{(4-a)/2}$ wherein R is a monovalent hydrocarbon or hydroxyl group and a is 1.95 to 2.05, (B) a finely divided silica filler, (C) an azodicarbonamide foaming agent, and (D) a diacyl peroxide, thereafter extruding the composition through an extruder, and thereafter foaming and vulcanizing the composition. The silicon sponge roll produced is suitable to form a fixing roll for use in electrographic copying machines.

11 Claims, 1 Drawing Sheet

FOAMABLE SILICONE COMPOSITION, SILICONE SPONGE, AND SILICONE SPONGE ROLL

This application is a divisional of copending application Ser. No. 07/527,359 filed on May 23, 1990.

The present invention relates to a foamable silicone composition. It also relates to silicone sponge obtained by foaming and curing the composition and articles formed of such sponge.

BACKGROUND OF THE INVENTION

In prior art electrostatic copying machines, a toner image is most often fixed to a sheet of paper using a heating roller. That is, a sheet of paper having a toner image formed thereon is passed through a pair of rollers in pressure contact, one or both of which are internally heated. Most advanced electrostatic copying machines adopt this fixing method using a heating roller because it has the advantages of heat efficiency and high speed operation over other fixing methods using an oven, for example.

Most of the currently used rolls for fixing toner images are silicone sponge rolls because they are heat resistant and can provide clear and soft images. However, the conventional silicone sponge rolls are insufficient in toner release so that the resulting images produce therewith are somewhat imprecise or indistinct. For promoting toner release, it has been a common practice to coat the silicone sponge roll on the surface with a liquid silicone rubber layer having toner releasability or to integrate a fluoride release layer with the roll surface. These methods undesirably complicate the overall manufacture process of silicone sponge rolls and add to the cost of fixing rolls.

The silicone sponge used for fixing rolls is required to be a foam body having a dense and uniform cellular structure. Azobisisobutyronitrile is used as a foaming agent in the prior art. Decomposition residues of this foaming agent are detrimental to a safe and hygienic environment and require long term heating for substantial decay.

SUMMARY OF THE INVENTION

Therefore, a primary object of the present invention is to provide a silicone sponge roll having a dense and uniform foam structure and improved toner releasability, and suitable for use as a fixing roll. Another object of the invention is to provide a foamable silicone composition from which the roll can be produced without encountering problems of a safety or hygiene aspect. A further object of the invention is to provide a silicone sponge.

Accordingly, with the present invention, there is provided a foamable silicone composition comprising (A) an organopolysiloxane free of an aliphatic unsaturated group having the general formula:

$$R_aSiO_{(4-a)/2} \tag{1}$$

wherein R is a substituted or unsubstituted monovalent hydrocarbon group having 1 to 10 carbon atoms or a hydroxyl group and letter a is a positive number in the range of from 1.95 to 2.05, (B) a finely divided silica filler, (C) an azodicarbonamide foaming agent having a decomposition temperature of up to 160° C., and (D) a diacyl peroxide having a decomposition temperature of up to 100° C. to provide a half-life of 10 hours.

A silicone sponge is obtained by causing the foamable silicone composition to foam and cure. A silicone sponge roll can be obtained from the silicone sponge.

Upon foaming, the foamable silicone composition leaves decomposition residues which invite little problem in safety and hygienic aspects, thus eliminating a need for long-term heating to remove such decomposition residues. The composition foams and cures into a silicone sponge at a high blowing magnification (ratio of foam volume to before-foaming volume). The silicone sponge which is fully cured from the interior to the surface is free of surface tack, uniform, and dense, and has improved toner releasability. Formation of an additional composite layer is needed no longer. Thus silicone sponge rolls having improved performance as fixing rolls are obtained at low cost.

DETAILED DESCRIPTION OF THE INVENTION

Figure 1:
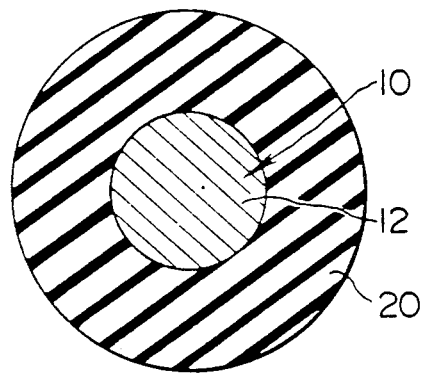
FIGS. 1 to 3 are sectional views of rolls according to different embodiments of the present invention.

The silicone sponge roll of the invention is mainly formed from a silicone sponge which is obtained by foaming and curing a foamable silicone composition comprising (A) an organopolysiloxane, (B) a silica filler, (C) a foaming agent, and (D) a peroxide.

Component (A) is an organopolysiloxane having the general formula:

$$R_aSiO_{(4-a)/2} \tag{1}$$

which is substantially free of an aliphatic unsaturated group. In formula (1), R is a substituted or unsubstituted monovalent hydrocarbon group having 1 to 10 carbon atoms or a hydroxyl group. Examples of the monovalent hydrocarbon group include alkyl groups such as methyl, ethyl, propyl, and butyl, aryl groups such as phenyl, and these groups substituted wherein some or all of the hydrogen atoms of the groups are replaced by halogen atoms, such as y-trifluoropropyl group. For ease of synthesis, heat resistance, and toner release, the R moiety preferably contains at least 50 mol %, especially at least 80 mol % of methyl. The letter a is a positive number in the range of from 1.95 to 2.05.

The organopolysiloxane of formula (1) should be substantially free of an aliphatic unsaturated group. If an alkenyl group such as vinyl is present in the organopolysiloxane even in a small amount, for example, as small as 0.2 mol %, then there results a hard foam or sponge which has a thin cured surface layer and which is discolored. These factors reduce the commercial value as the sponge for fixing rolls. In addition, the toner releasability of the sponge rolls is substantially lost.

The organopolysiloxane of formula (1) desirably has a molecular structure which is as linear as possible, although a partially branched structure is acceptable. Its molecular chain preferably terminates with a triorganosilyl group such as trimethylsilyl or a hydroxyl group.

The organopolysiloxane preferably has a viscosity of at least 100,000 centistokes, preferably 100,000 to 10,000,000 centistokes at 25° C. although its degree of polymerization is not critical.

Component (B) is a finely divided silica filler which is added for the purposes of reinforcement, viscosity buildup, processability improvement, and extension of the silicone rubber. To this end, fumed silica, wet silica, quartz powder, and diatomaceous earth are useful. These fillers preferably have a specific surface area of at least 1 m²/g as measured by the BET method. The silica filler preferably has an average particle size of 0.005 to 100 μm, especially 0.005 to 5 μm.

Filler (B) is preferably blended in an amount of 3 to 100 parts, more preferably 5 to 30 parts by weight per 100 parts by weight of organopolysiloxane (A). A composition having less than 3 parts by weight of such a filler is only weakly reinforced and loses processability, whereas the flow required in a mold becomes extremely low when more than 100 parts by weight of the filler are use used.

Component (C) is an azodicarbonamide foaming agent having a decomposition temperature of up to 160° C., preferably 100° to 160° C., and is higher than the decomposition temperature which allows component (D) to have a half-life of 10 hours. This foaming agent is generally prepared by adding an additive to azodicarbonamide. Examples of the additive include urea, urea compounds (e.g., lower alkyl ureas such as methylurea, ethylurea, propylurea, and butylurea and higher fatty acid salts of urea such as urea laurate, urea stearate, and urea oleate), dibasic lead phthalate, zinc oxide, stearic acid, zinc stearate, and polyethylene glycol. Mixtures of azodicarbonamide with at least one of urea, urea compounds, zinc oxide, stearic acid, and zinc stearate being preferred due to both safety and hygiene aspects. Preferred mixtures contain 100 parts by weight of azodicarbonamide and 1 to 300 parts, especially 30 to 150 parts by weight of urea or a urea compound and 0 to 100 parts by weight of zinc oxide or any other additive, with the total of the additives being limited to 1 to 500 parts, especially 50 to 200 parts by weight. Such mixtures are commercially available (e.g., CELMIC® CAP and CAP-250 from Sankyo Chemicals K.K.)

Foaming agent (C) is preferably blended in an amount of 0.1 to 10 parts, more preferably 0.5 to 7 parts by weight per 100 parts by weight of organopolysiloxane (A). Less than 0.1 parts by weight of the foaming agent would be ineffective for foaming whereas more than 10 parts by weight of the foaming agent would produce unnecessary decomposition residues and cause discoloration or cracks as a result of excessive foaming.

Component (D) is a diacyl peroxide having a decomposition temperature of up to 100° C., preferably 30° to 100° C., which allows for a half-life of 10 hours. The peroxide is added as a vulcanizing agent for promoting heat curing of the silicone rubber. Exemplary of the peroxide are benzoyl peroxide, di(2,4-dichlorobenzoyl) peroxide, di(p-chlorobenzoyl) peroxide, di(o-chlorobenzoyl) peroxide, di(p-methylbenzoyl) peroxide, di(o-methylbenzoyl) peroxide, di(p-bromobenzoyl) peroxide, di(o-bromobenzoyl) peroxide, di(2,4-dimethylbenzoyl) peroxide, di(p-trimethylsilylbenzoyl) peroxide, and mixtures thereof.

Peroxide (D) is preferably blended in an amount of 0.1 to 10 parts, more preferably 0.1 to 3 parts by weight per 100 parts by weight of organopolysiloxane (A) although its amount may be suitably determined depending on the type and amount of other components. Less than 0.1 parts by weight of the peroxide results in a foamed body which is less elastic because of short vulcanization. With more than 10 parts by weight of the peroxide, vulcanization occurs in advance of foaming, failing to form a soft foamed body.

In addition to components (A) to (D), the foamable silicone composition of the present invention may contain any desired additives. Such additives include a dispersant such as a low-molecular weight siloxane having a degree of polymerization of to 100, a silanol group-containing silane, and an alkoxy group-containing silane; a heat resistance modifier such as iron oxide, cerium oxide, iron octylate, and titanium oxide; a pigment for coloring; a flame retardant such as platinum compounds and palladium compounds; and other additives commonly used in conventional silicone rubber compositions.

A silicone sponge may be obtained by uniformly mixing the above-mentioned components in a conventional manner and causing the mixture to foam and cure. The blowing magnification preferably ranges from 200 to 500%. The foaming and curing method is not particularly limited and any desired method commonly used in the manufacture of silicone rubber foams may be used. For example, hot air vulcanization may be carried out at a temperature of 150° to 300° C and at an atmospheric pressure, for 10 seconds to 30 minutes. Another useful method is by charging a mold with the silicone composition and vulcanizing the composition at a temperature of 100° to 200° C. for 2 to 10 minutes. A fixing roll may be produced by these methods. Alternatively, a fixing roll can be produced by extruding the silicone composition through an extruder, and causing the extrudate to foam and cure in an atmospheric steam vulcanization tower, infrared vulcanization tower, UHF vulcanization tower or similar vulcanization apparatus. A fixing roll can also be manufactured by extruding the silicone composition into a roll form, cutting the unvulcanized extrudate to a suitable length, heating it for foaming in an oven, and inserting a metal mandrel through the resulting roll. It is also possible to cause the silicone composition to foam and cure in a mold with a metal mandrel inserted therein.

After the foaming and curing step, if desired, the silicone sponge or roll is post cured at 150° to 220° C. for 0 to 8 hours, which completes the vulcanization and decomposition of the foaming agent.

The resulting silicone sponge has a high foaming factor, a uniform and dense cellular structure, and improved toner releasability so that it may perform well as a fixing roll. It can be advantageously used as fixing rolls for electrostatic copying machines, oil coating rolls, and cleaning rolls. The silicone sponge can also find applications as gaskets for building utility and heat insulating tubes.

Figure 2:
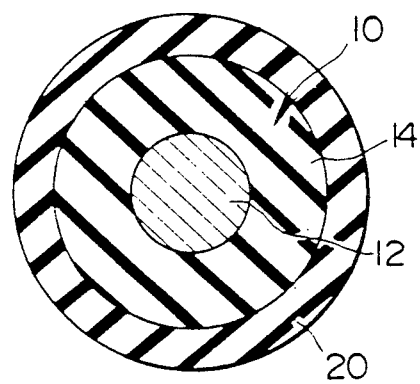
Figure 3:
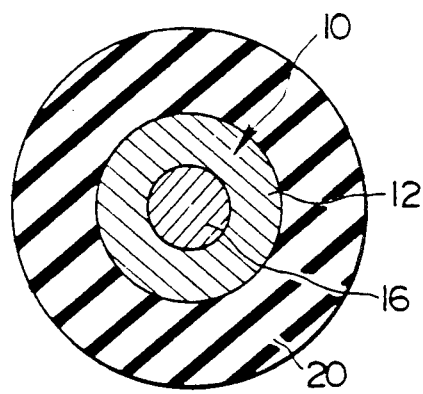

A silicone sponge roll, particularly a fixing roll may include a roll body and a rubber layer formed on the outer surface of the roll body. The rubber layer is made of the silicone sponge of the invention. The roll body may be made of a metal such as aluminum, alloy, and stainless steel, or a metal having a rubber applied thereon. The roll body may have a heater received therein. FIGS. 1 to 3 show some embodiments of the fixing roll. In FIG. 1, a roll body 10 consisting of a metal core 12 is covered with a layer 20 formed from the silicone composition of the present invention. In FIG. 2, a roll body 10 consisting of a metal core 12 and a rubber sleeve 14, which is a conventional sleeve for a fixing roll and is covered with a layer 20 of the silicone composition of the present invention. In FIG. 3, a roll body 10 consisting of a metal core 12 having a heater 16 inserted therein, and is covered with a layer 20 of the silicone composition of the present invention.

If desired, the silicone sponge roll of the invention may be coated on a surface thereof with a polyfluoroalkylene (PFA) resin, polytetrafluoroethylene (PTFE) resin, room temperature vulcanizable silicone fluid, or low temperature vulcanizable silicone fluid, which becomes eventually integrated with the substrate.

The foamable silicone composition according to the present invention can foam and cure into a silicone sponge at a high foaming factor without presenting either a safety or hygiene problem. The silicone sponge has a uniform and dense cellular structure and improved toner releasability. Rolls comprising the silicone sponge are very suitable as fixing rolls for electrostatic copying machines or the like.

EXAMPLE

Examples of the invention are given below by way of illustration and not by way of limitation. All parts and percents are by weight unless otherwise stated. Viscosity is measured at 25° C.

EXAMPLE 1

A base compound was prepared by adding 30 parts of fumed silica (trade name Aerogel A-200, Nihon Aerogel K.K.) and 5 parts of dimethylpolysiloxane (viscosity ~15 centistokes) blocked with a hydroxyl group at each end as a dispersant to 100 parts of dimethylpolysiloxane (viscosity ~10,000,000 centistokes) having structural units shown in Table 1, blocked with a trimethylsilyl group at each end, and free of a vinyl group. The ingredients were mixed in an internal mixer to form a dispersion, which was heat treated for about 2 hours at 160° C.

A composition was prepared by adding 5 parts of azodicarbonamide foaming agen (trade name CELMIC CAP-250, Sankyo Chemicals K.K.) and 2 parts of a 50% silicone oil paste of di(p-methylbenzoyl) peroxide vulcanizing agent to 100 parts of the base compound and thoroughly milling the mixture.

The composition was rolled into a sheet of 50 mm × 50 mm × 4 mm (thick). It was foamed and cured into a silicone sponge sample by heating for 20 minutes in an oven at 200° C.

The sample was visually observed for outer appearance, measured for specific gravity and hardness (Ascar C scale), and examined for toner stain by the following method.

Toner stain

A pair of silicone sponge sheets having toner sandwiched therebetween were placed in an oven and heated to 250° C. at which the toner was melted, and then cooled down. The sheets were separated and visually observed how the sheet surface was stained with the toner.

The results are shown in Table 1.

EXAMPLE 2

For comparison purposes, a silicone sponge sample was prepared by the same procedures as in Example 1 except that vinyl-containing methylpolysiloxane having structural units shown in Table 1 and blocked with a trimethylsilyl group at each end. The sample was examined for outer appearance, specific gravity, hardness, and toner stain.

The results are shown in Table 1.

TABLE 1

|  | Example 1 | Example 2* |
| --- | --- | --- |
| Structural unit |  |  |
| (CH$_3$)$_2$SiO | 99.975 mol % | 99.775 mol % |
| (CH$_2$=CH)CH$_3$SiO | — | 0.200 mol % |
| (CH$_3$)$_3$SiO$_{\frac{1}{2}}$ | 0.025 mol % | 0.025 mol % |
| Total | 100.0 mol % | 100.0 mol % |
| Specific gravity | 0.31 | 0.78 |
| Hardness, Ascar C | 20 | 42 |
| Appearance | aesthetic, uniform foam | brown, short-foamed/cured stained |
| Toner stain | no stain | stained |

*outside the scope of the invention

EXAMPLE 3

A composition was prepared by adding 5 parts of azodicarbonamide foaming agent (trade name CELMIC CAP-250, Sankyo Chemicals K.K.) and 1.2 parts of a 49% silicone oil paste of di(2,4-dichlorobenzoyl) peroxide vulcanizing agent to 100 parts of the base compound used in Example 1 and thoroughly milling the mixture.

The composition was extruded into a cylinder having an outer diameter of 12 mm and an inner diameter of 6 mm through an extruder having a barrel diameter of 70 mm. The unvulcanized cylinder was cut to a length of 30 cm.

The molded cylinder was heated for 20 minutes in an oven at 200° C. for foaming, and then post curved at the temperature for 4 hours, obtaining a silicone sponge roll.

A metal core was inserted into the sponge roll, obtaining a fixing roll as shown in FIG. 1. The fixing roll was mounted in a commercial electrostatic copying machine where copying operation was conducted for a test. The roll was set in pressure contact conditions including a total pressure of 20 kgf and a circumferential speed of 70 mm/sec. Plain sheets of A-4 size were copied at a rate of 10 sheets per minute to a total of 10,000 sheets.

In the copying test, the fixing roll using the silicone sponge of the invention was free of toner stain and allowed for continuous reproduction of copies of high image quality.

Several preferred embodiments have been described. Obviously many modifications and variations of the present invention are possible in the light of the above teachings. It is therefore to be understood that within the scope of the appended claims, the invention may be practiced otherwise than as specifically described.

We claim:

1. A method of preparing a silicone sponge roll comprising a roll body having a metal core or a metal core and a rubber sleeve, and a silicone rubber layer formed on the outer surface of the roll body, the method comprising the steps of:

mixing uniformly a foamable silicone composition comprising (A) 100 parts by weight of an organopolysiloxane free of an aliphatic unsaturated group, the organopolysiloxane being represented by Formula (I)

$$R_aSiO_{(4-a)/2}. \tag{I}$$

wherein R is a substituted or unsubstituted monovalent hydrocarbon group having 1 to 10 carbon atoms or a hydroxyl group, and the letter a is a positive number in the range of from 1.95 to 2.05,
(B) 3 to 100 parts by weight of a finely divided silica filler,
(C) 0.1 to 10 parts by weight of an azodicarbonamide foaming agent having a decomposition temperature of 100° to 160° C., and
(D) 0.1 to 10 parts by weight of a diacyl peroxide having a decomposition temperature of 30° to 100° C. to provide a half-life of about 10 hours, the diacyl peroxide being selected from the group consisting of benzoyl peroxide, di(2,4-dichlorobenzoyl)peroxide, di(p-chlorobenzoyl)peroxide, di(o-chlorobenzoyl)-peroxide, di(p-methylbenzoyl)-peroxide, di(o-methylbenzoyl)peroxide, di(p-bromobenzoyl)peroxide, di(o-bromobenzoyl)-peroxide, di(2,4-dimethylbenzoyl)-peroxide, di(p-trimethylsilybenzoyl)peroxide, and mixtures thereof,
extruding the silicone composition through an extruder onto the roll body to form a layer; and
foaming and vulcanizing the extruded product at a temperature of 150° to 300° C. at atmospheric pressure for 10 seconds to 30 minutes to form the silicone sponge rubber layer on the outer surface of the roll body.

2. The method of claim 1, wherein the Formula (I) organopolysiloxane of component (A) has a viscosity of at least 100,000 centistokes at 25° C.

3. The method of claim 1, wherein the majority of R in Formula (I) are monovalent hydrocarbon groups.

4. The method of claim 1, wherein R in Formula (I) is a halogen substituted monovalent hydrocarbon.

5. The method of claim 3, wherein R in Formula (I) is a monovalent alkyl group or a monovalent aryl group.

6. The method of claim 1, wherein the majority of R in Formula (I) are methyl groups.

7. The method of claim 1, wherein the component (B) finely divided silica filler has a surface area of at least $1 m^2/g$.

8. The method of claim 1, wherein the component (B) finely divided silica filler is selected from the group consisting of:
fumed silica, wet silica, quartz powder, and diatomaceous earth.

9. The method of claim 1, wherein the component (C) is azodicarbonamide in admixture with at least one member selected from the group consisting of urea, a urea compound, zinc oxide, stearic acid, and zinc stearate.

10. The method of claim 1, further comprising a post curing step of heating the prepared sponge roll at 150°-220° C. for up to 8 hours.

11. The method of claim 1, further comprising the step of coating on a surface of the prepared sponge roll a perfluoroalkylene resin, a polytetrafluoroethylene resin, a room tempeature vulcanizable silicone fluid or a low temperature vulcanizable silicone fluid.

* * * * *